United States Patent
Fujiwara et al.

(10) Patent No.: US 8,481,889 B2
(45) Date of Patent: Jul. 9, 2013

(54) HAND GRIP MEMBER WITH ELECTRIC HEATER

(75) Inventors: Satoru Fujiwara, Tokyo (JP); Kouzou Sasaki, Tokyo (JP); Yuichi Fukuda, Tokyo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 1222 days.

(21) Appl. No.: 12/088,543

(22) PCT Filed: Sep. 29, 2006

(86) PCT No.: PCT/JP2006/319515
§ 371 (c)(1),
(2), (4) Date: Jan. 5, 2009

(87) PCT Pub. No.: WO2007/037399
PCT Pub. Date: Apr. 5, 2007

(65) Prior Publication Data
US 2009/0194518 A1    Aug. 6, 2009

(30) Foreign Application Priority Data
Sep. 30, 2005  (JP) ................... 2005-287465

(51) Int. Cl.
*H05B 3/06*    (2006.01)
*H05B 3/40*    (2006.01)
*B62K 21/26*   (2006.01)
*B62J 33/00*   (2006.01)

(52) U.S. Cl.
USPC ........... 219/204; 219/522; 219/535; 219/541; 219/544; 219/548; 74/551.9

(58) Field of Classification Search
None
See application file for complete search history.

(56) References Cited

U.S. PATENT DOCUMENTS

| | | | | |
|---|---|---|---|---|
| 3,667,435 A * | 6/1972 | Bygdnes | .................. | 123/327 |
| 4,990,753 A | 2/1991 | Hollander | | |
| 5,613,407 A | 3/1997 | Ogata | | |
| 5,834,734 A * | 11/1998 | Ogata | .................. | 219/204 |
| 6,114,668 A * | 9/2000 | Ogata et al. | ............. | 219/494 |
| 6,131,484 A * | 10/2000 | Wang | .................. | 74/543 |
| 6,686,572 B1 * | 2/2004 | Wu | .................. | 219/533 |
| 6,998,576 B2 * | 2/2006 | Marquis | ............. | 219/204 |
| 7,891,270 B2 * | 2/2011 | Higashi | ............. | 74/551.9 |
| 2003/0056618 A1 | 3/2003 | Dzurnak | | |

(Continued)

FOREIGN PATENT DOCUMENTS

| JP | 63-189990 U | 12/1988 |
|---|---|---|
| JP | 6-59829 B2 | 8/1994 |

(Continued)

*Primary Examiner* — Joseph M Pelham
(74) *Attorney, Agent, or Firm* — Holtz, Holtz, Goodman & Chick, P.C.

(57) ABSTRACT

A handle grip member with electric heater can be produced in high yield through simple processing not using any core of synthetic resin and avoiding molding operation. Depressed groove (4) is spirally provided on an external surface of inner part (1) of rubber, and multiple ribs (5) are provided on an internal surface thereof along the direction of length. Electric heater (7) of tape-shaped metal conductor is implanted in the depressed groove (4), and fixed. Electric wires (8a, 8b) are connected to two ends of the electric heater (7) and drawn out. The inner part (1) is inserted in outer part (9) of rubber tube, and the outer part (9) is fixed to the inner part (1) with the use of an adhesive, etc.

6 Claims, 5 Drawing Sheets

U.S. PATENT DOCUMENTS

| | | | |
|---|---|---|---|
| 2004/0007567 A1* | 1/2004 | Downey et al. | 219/494 |
| 2005/0103769 A1* | 5/2005 | Marquis | 219/204 |
| 2007/0068333 A1* | 3/2007 | Hunter | 74/551.9 |
| 2007/0221644 A1* | 9/2007 | Gifford et al. | 219/204 |
| 2008/0116188 A1* | 5/2008 | Fukuda et al. | 219/204 |

FOREIGN PATENT DOCUMENTS

| | | |
|---|---|---|
| JP | 8-26165 A | 1/1996 |
| JP | 8-5115 Y2 | 2/1996 |
| JP | 2535941 Y2 | 2/1997 |
| JP | 10-67366 A | 3/1998 |
| JP | 2002-96785 A | 4/2002 |
| JP | 2003-70876 A | 3/2003 |
| JP | 2003-127946 A | 5/2003 |
| JP | 2004-148988 A | 5/2004 |
| JP | 2004-345382 A | 12/2004 |
| JP | 2006-306316 A | 11/2006 |
| JP | 2006-306318 A | 11/2006 |

* cited by examiner

HAND GRIP MEMBER WITH ELECTRIC HEATER

This application is a U.S. National Phase Application under 35 USC 371 of International Application PCT/JP2006/319515 filed Sep. 29, 2006.

FIELD OF THE INVENTION

The present invention relates to a handle grip member with electric heater for use in motorcycles, snowmobiles and so on.

BACKGROUND OF THE INVENTION

In handle grip members for motorcycles, snowmobiles and so on, electric heating wires are installed within handle grip members made of synthetic rubber for warming hands of users as described in, for instance, the following Patent Document 1. In this known handle grip member with electric heater, after connecting electric power supply wires to both ends of an electric heating body of sheet type, the electric heating body sheet is wound around a core body made of a synthetic resin, and then an assembly of the core body and heating body is covered with a synthetic rubber by molding to attain electric insulation and an anti-slip surface.

The Patent Document 1: Japanese Patent Laid-opened Publication Kokai Hei 10-67366

DISCLOSURE OF THE INVENTION

Problems to be Solved by the Invention

In the known handle grip member with electric heater disclosed in the Patent Document 1, a process for molding the synthetic rubber is cumbersome and a cycle time is prolonged. Moreover, during the molding process, synthetic resin core body and its outer appearance might be deformed due to heat and pressure. Furthermore, connection points between the electric heating body and electric power supply wires might be broken to cause trouble. In this manner, manufacturing yield of the known handle grip member with electric heater could not be high.

The present invention has for its object to provide a handle grip member with electric heater which can resolve the above mentioned problems and can be manufactured easily without molding.

Means for Solving the Problems

According to the invention, in order to achieve the above mentioned object, a handle grip member with electric heater comprises an inner part formed by a cylindrical rubber body, an electric heating body provided on an outer surface of the inner part, and an outer part formed by a cylindrical rubber body, an assembly of the inner part and electric heating body being inserted into the outer part.

Merit of the Invention

In the handle grip member with electric heater according to the invention, since use is not made of a synthetic resin core body and molding process, the handle grip member with electric heater can be manufactured by simple processes with a high yield.

Figure 1:
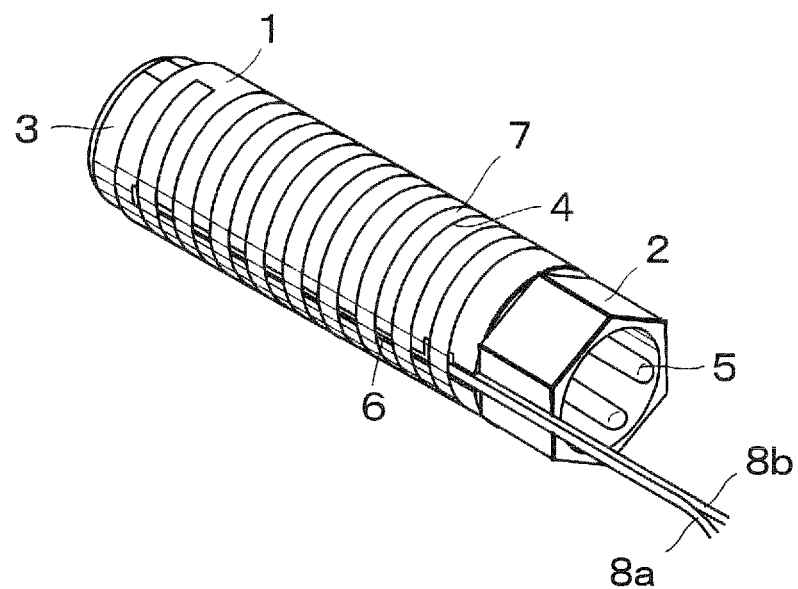
FIG. 1 is a perspective view showing an inner part of a first embodiment of the handle grip member with electric heater according to the invention.

EXPLANATION OF THE REFERENCE NUMERALS 1 inner part
2 rectangular tube portion
3 ring-shaped portion
4 recess
5 rib
6 groove for electric power supply wire
7 electric heater
8a, 8b electric power supply wire
9, 21 outer part
10 grip flange portion
22 metal part
23 projection
24 opening
25 projected portion

BEST MODES OF THE INVENTION

Now the present invention will be explained in detail with reference to the embodiments shown in the drawings.

Embodiment 1

FIG. 1 is a perspective view showing a condition in which an electric heating body is wound around an inner part in a first embodiment of the handle grip member with electric heater according to the invention. The inner part 1 constituting a major structural body of the handle grip member is made of a hard synthetic rubber and is formed into a cylindrical shape. At a root end of the inner part 1, is formed a rectangular tube portion 2 having a hexagonal outer configuration. At a free end of the inner part 1 is formed a ring-shaped portion 3. The inner part 1 is preferably made of synthetic rubber such as NBR and EPDM in view of mechanical strength.

In an outer surface of the inner part 1 there is formed a recess 4 helically. On an inner surface of the inner part 1, there are formed three to eight ribs 5 extending in a longitudinal direction. The ribs 5 are preferably formed to have a square or semicircular cross sectional configuration. In the outer surface of the inner part 1 there is further formed a power supply wire groove 6 such that the groove crosses respective turns of the recess 4 and extends deeper than the recess 4. An electric heater 7 formed by a metal conductor tape is provided within the recess 4 and is secured thereto.

The electric heater 7 is preferably formed by SUS or copper and has a width of 2-7 mm and a thickness of 0.02-0.1 mm. A depth of the recess 4 may be set to a value substantially equal to a thickness of the electric heater 7, and is preferably set to a value slightly larger than a thickness of the electric heater 7 in view of succeeding processes.

A pitch of the recess 4 may be preferably set to 7-15 mm, particularly 8-12 mm considering uniform heating, heat rising property, heat descending property and a width of the electric heater 7. A longitudinal length of the heating portion is determined by a length of the handle grip, and is preferably set to 80-150 mm, particularly 90-120 mm for warming user's hand.

To both ends of the electric heater 7 are connected electric power supply wires 8a and 8b, these wires being covered with insulating sheaths. The electric power supply wire 8a is provided within the groove 6 such that the wire extends under the electric heater 7 and is extended besides the ring-shaped portion 3 of the inner part 1. The other electric power supply wire 8b is connected to the electric heater 7 at a site near the rectangular tube portion 2. It should be noted that the electric power supply wire 8a should be inserted into the groove 6 before winding the electric heater 7.

Figure 2:
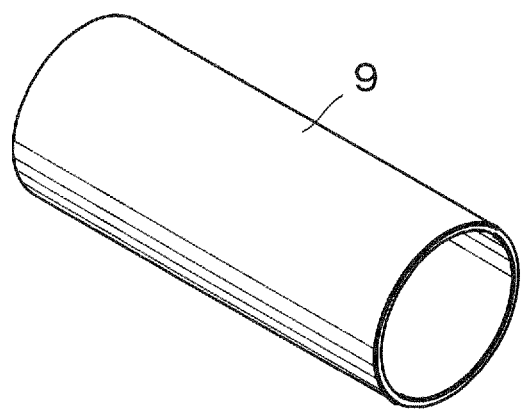
FIG. 2 is a perspective view illustrating an outer part.
Figure 3:
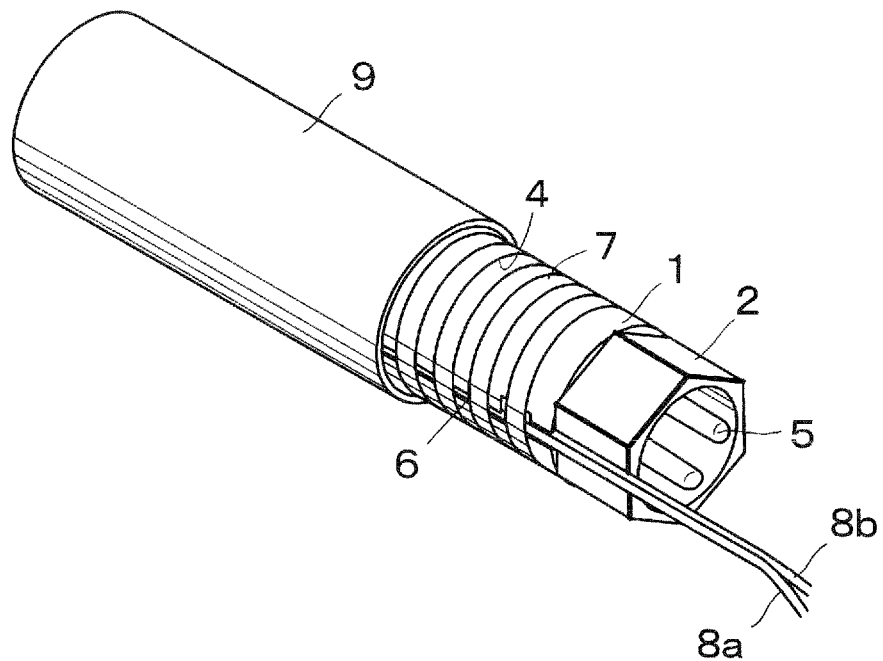
FIG. 3 is a perspective view depicting a process for inserting the outer part onto the inner part.

FIG. 2 is a perspective view showing an outer part 9. The outer part 9 is formed by molding a synthetic rubber into a tubular body. The outer part 9 is slipped onto the inner part 1 having the electric heater 7 wound thereon. FIG. 3 denotes a condition while the outer part 9 is slipped onto the inner part 1. At first, an adhesive tape having a heat resistant adhesive applied on both sides thereof is wound on the electric heater 7, and a volatile organic solvent is applied on the outer surface of the adhesive tape to increase a slippage. Then, the outer part 9 is applied onto the inner part 1. After evaporating the solvent by drying, adhesive force of the adhesive is recovered and the outer part 9 is fixed to the inner part 1.

Figure 4:
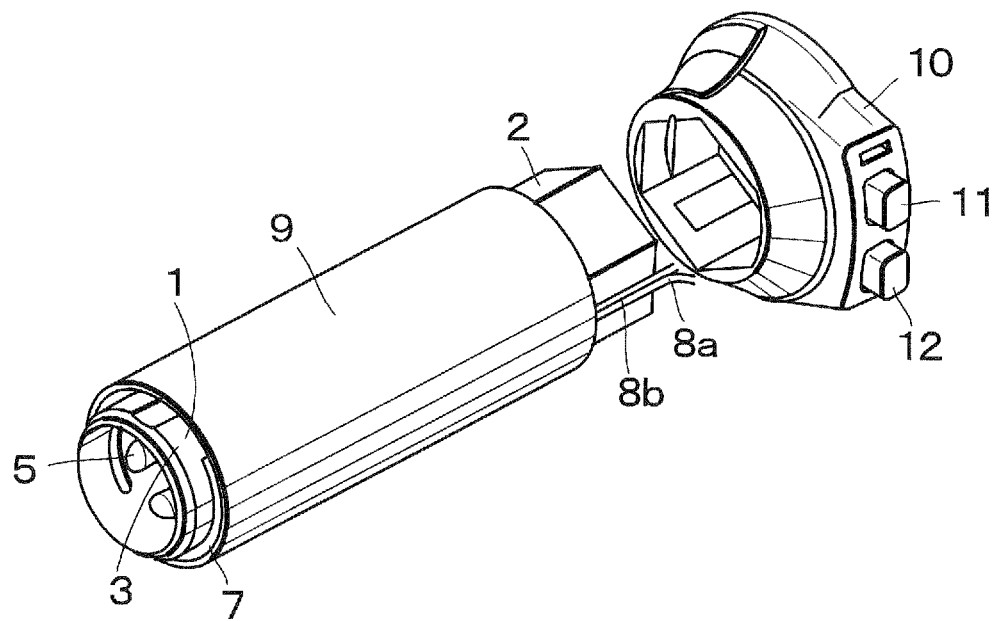
FIG. 4 is a perspective view showing a condition in which a grip member is inserted into a grip flange body.
Figure 5:
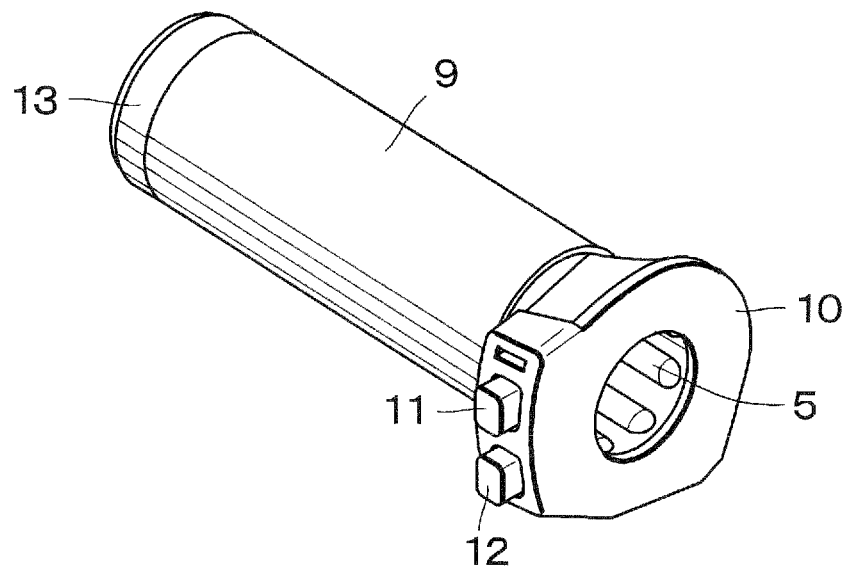
FIG. 5 is a perspective view illustrating a condition in which the grip member has been inserted into the grip flange body.

After assembling the inner part 1 and outer part 9 to form a grip portion, the rectangular tube portion 2 of the inner part 1 is inserted into a grip flange portion 10 made of synthetic resin as illustrated in FIG. 4 to form the handle grip member with electric heater shown in FIG. 5. In this case, the rectangular tube portion 2 is inserted into a hole having a corresponding rectangular shape of the grip flange portion 10. Although the grip portion is subjected to a rotational force during the driving, the grip portion could not be freely rotated with respect to the grip flange portion 10. Before inserting the grip portion into the grip flange portion 10, free ends of the electric power supply wires 8a and 8b are connected to terminals provided in the grip flange portion 10, said terminals being not shown in the drawings.

The electric power supply wires 8a and 8b are connected to an electric power source, i.e. battery via the terminals provided in the grip flange portion 10 and a cable not shown. Switches 11 and 12 provided on the grip flanged portion 10 may be used as a controller switch for the electric heater 7 and as a direction indicator switch. Furthermore, an end part 13 is provided at a free end of the grip portion.

By fitting the thus completed handle grip member to a rod-like handlebar of a motor bicycle, the handle grip member can be uses as a handle grip with electric heater. Since the ribs 5 are formed on the inner surface of the inner part 1, the handle grip member could not be freely rotated with respect to the handlebar.

Embodiment 2

Figure 6:
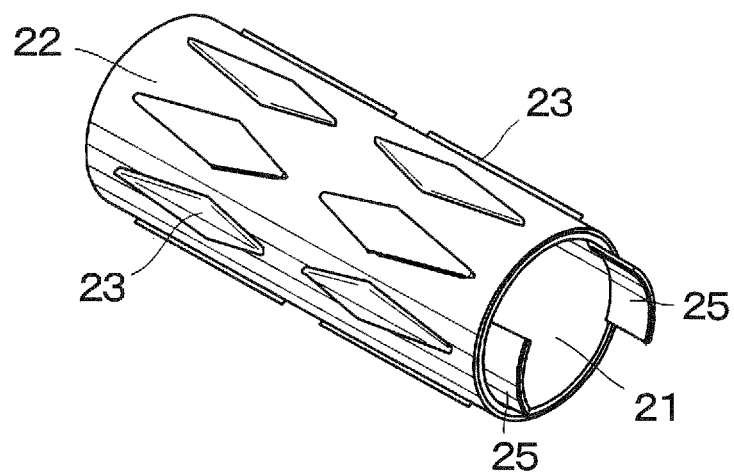
FIG. 6 is a perspective view denoting a condition in which a metal part is applied on an outer part of a second embodiment of the handle grip member according to the invention.
Figure 7:
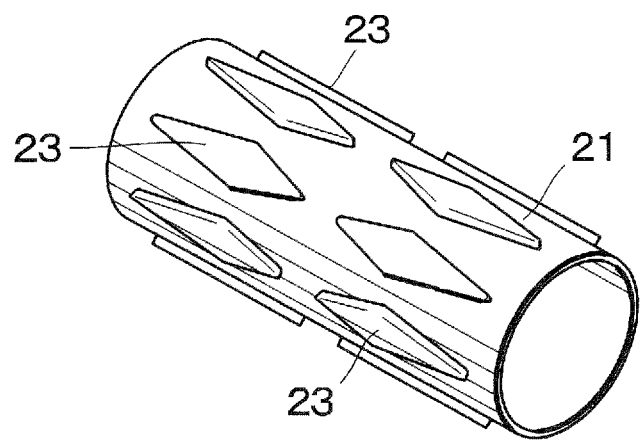
FIG. 7 is a perspective view showing the outer part.
Figure 8:
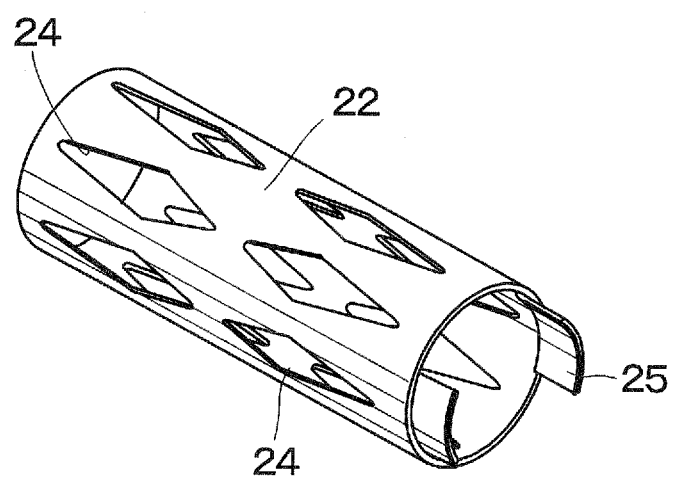
FIG. 8 is a perspective view depicting the metal part.

FIG. 6 is a perspective view showing a condition in which a metal part is applied on an outer part in a second embodiment of the handle grip member with electric heater according to the invention. A tubular metal part 22 shown in FIG. 7 is applied on an outer part 21 made of rubber illustrated in FIG. 8.

On the outer surface of the outer part 21 there are formed a plurality of projections 23 each having a substantially diamond-shaped configuration and a flat surface. The metal part 22 may be formed by SUS or plated steel sheet and has formed therein a plurality of openings 24 into which the projections 23 of the outer part 21 are to be inserted. Therefore, the opening 24 has a corresponding shape to the projection 23. At front and rear ends of the metal part 22, there are formed projected portions 25.

Upon assembling the outer part and metal part, the outer part 21 made of rubber is inserted into the metal part 22 such that the projections 23 are clamped into the openings 24. Then, the outer part 21 and metal part 22 form a unit body and the mechanical strength of the outer part 21 is reinforced.

In this case, it is preferable that a height of the projections 23 is slightly larger than a thickness of the metal part 22. Then, the projections 23 extend beyond the openings 24 and a surface resistance of the handle grip member becomes large to attain safety. The two projected portions 25 extended from the metal part 22 cover the electric power supply wires 8a and 8b and also serve to prevent any undesired rotation in combination of the grip flange portion 10.

Figure 9:
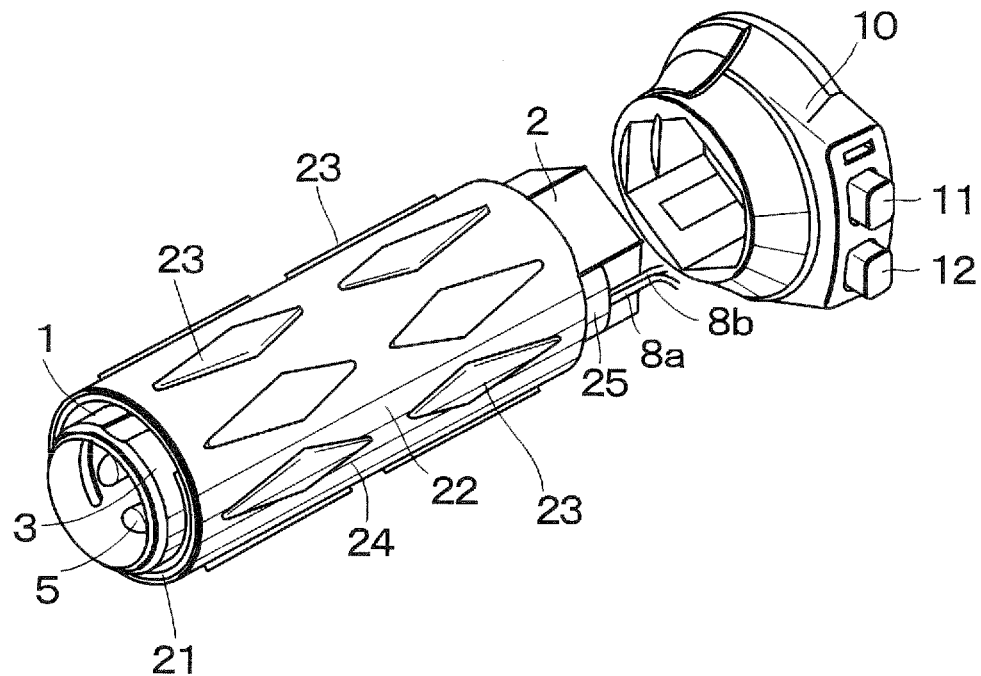
FIG. 9 is a perspective view illustrating a condition in which the grip member and grip flange body are assembled.
Figure 10:
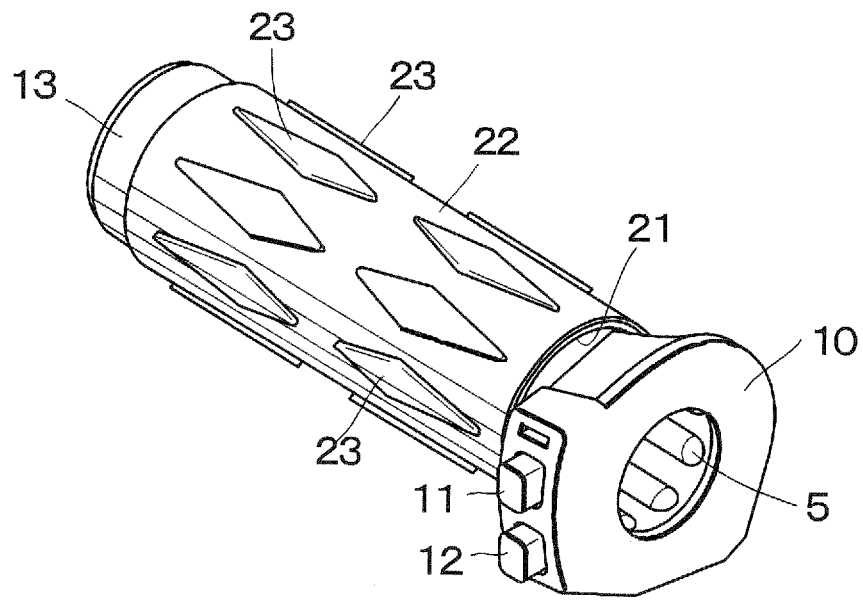
FIG. 10 is a perspective view showing a condition in which the grip member has been assembled with the grip flange body.

FIG. 9 is a perspective view showing a condition in which the inner part 1 shown in FIG. 1 is inserted into the outer part 21 having the metal part 22 applied thereon, but before fitting the grip flange portion 10. FIG. 10 is perspective view showing a condition in which the grip member has been assembled with the grip flange body.

In the second embodiment 2, the handle grip member is reinforced by the metal part 22 and ornamentation of the handle grip member is also enhanced by the metal part 22.

What is claimed is:

1. A handle grip member with an electric heater, the handle grip member comprising:
    an inner part comprising a cylindrical rubber body,
    a tube portion integrally formed at a first end of the inner part, an outer surface of the tube portion having a polygonal shape in cross section,
    an electric heating body provided on an outer surface of the inner part,
    an outer part comprising a tubular rubber body, and
    a grip flange portion, said grip flange portion defining therein a hole,
    wherein an inner surface of the hole has a shape in cross section which corresponds to the polygonal shape of the tube portion,
    wherein the tube portion is received in the hole of the grip flange portion so as to prevent relative free rotation between the inner part and the grip flange portion, and
    wherein the electric heating body is connected to electric power supply wires.

2. The handle grip member according to claim 1, wherein said electric heating body comprises a metal tape and is helically wound on the inner part.

3. The handle grip member according to claim 2, wherein:
    a recess is helically formed in the outer surface of the inner part, and a groove is formed in the outer surface of the inner part along a longitudinal direction thereof such that a depth of the groove is larger than a depth of the recess,
    said electric heating body is provided within the recess to form a helical winding, and an end of the electric heating body is connected to one of the electric power supply wires which extends within the groove under the electric heating body up to said grip flange portion.

4. The handle grip member according to claim 1, further comprising anti-slipping ribs provided on an inner surface of the inner part.

5. The handle grip member according to claim 1, wherein said outer part is secured to the inner part with an adhesive.

6. The handle grip member according to claim 1, further comprising a tubular metal part which has openings formed therein and which is provided on the outer part such that portions of the outer part project into said openings.

* * * * *